United States Patent [19]

Gustafson et al.

[11] Patent Number: 5,306,537
[45] Date of Patent: Apr. 26, 1994

[54] WEAR RESISTANT COATING FOR GLASS RUN CHANNEL

[75] Inventors: Thomas L. Gustafson; Lou Citarel, both of Southfield, Mich.

[73] Assignee: The Standard Products Company, Cleveland, Ohio

[21] Appl. No.: 812,121

[22] Filed: Dec. 20, 1991

[51] Int. Cl.⁵ .................. B32B 25/08; E06B 7/16; B05D 3/02
[52] U.S. Cl. .................. 428/141; 428/192; 428/194; 428/332; 428/516; 428/517; 428/908.8; 49/440; 49/441; 427/195
[58] Field of Search ............... 428/332, 516, 517, 200, 428/192, 194, 141, 908.8; 49/440, 441

[56]     References Cited
        U.S. PATENT DOCUMENTS

| | | |
|---|---|---|
| 3,048,482 | 8/1962 | Hurst . |
| 3,193,428 | 7/1965 | Palmer . |
| 3,624,964 | 12/1971 | Bordner et al. . |
| 3,659,983 | 5/1972 | McLain et al. . |
| 3,706,173 | 12/1972 | Taylor . |
| 3,918,206 | 11/1975 | Dochnahl . |
| 4,088,729 | 5/1978 | Sherman . |
| 4,104,098 | 8/1978 | Hush et al. . |
| 4,296,062 | 10/1981 | Gauchel et al. . |
| 4,483,893 | 11/1984 | Harrold . |
| 4,538,380 | 9/1985 | Colliander . |
| 4,596,734 | 6/1986 | Kramer . |
| 4,653,236 | 3/1987 | Grimes et al. . |
| 4,913,976 | 4/1990 | Brooks et al. . |
| 4,923,759 | 5/1990 | Brooks et al. . |
| 5,013,379 | 5/1991 | Brooks et al. . |
| 5,014,464 | 5/1991 | Dupuy et al. . |

FOREIGN PATENT DOCUMENTS

| | | |
|---|---|---|
| 0200618 | 12/1986 | European Pat. Off. . |
| 0325830 | 2/1989 | European Pat. Off. . |
| 1268107 | 6/1971 | U.S.S.R. . |

Primary Examiner—P. C. Sluby
Attorney, Agent, or Firm—Harness, Dickey & Pierce

[57]     ABSTRACT

A low friction wear resistant coating for the base of a glass run channel and method. A thermoplastic powder is applied to a thermoset rubber substrate. The combination is heated to form free form shaped domains of thermoplastic on the thermoset rubber.

9 Claims, 2 Drawing Sheets

WEAR RESISTANT COATING FOR GLASS RUN CHANNEL

BACKGROUND OF THE INVENTION

The present invention relates to a wear resistant low friction coating for a glass run channel or the like and a method for providing such a coating on a glass run channel. More particularly, the present invention relates to a thermoplastic discontinuous coating for a glass run channel.

Low friction coatings such as flocks and polytetrafluoro ethylene coatings are known in the art for providing reduced resistance at contact points between windows and glass run channels. While such coatings are suitable for reducing friction between the rubber glass run and the window, such coatings do not have good wear resistant characteristics as load bearing surfaces.

A particular problem in glass run channel applications has been wear through at the base of the glass run channel. Therefore, it has been a goal in the art to provide some mechanism for reducing wear at the base of a glass run channel to thereby increase the life of glass run channels in vehicle applications.

One such structure is shown in U.S. Pat. Nos. 4,923,759; 4,913,976; and 5,013,379. These patents teach the co-extrusion of a polypropylene wear strip at the base of a glass run channel, which is melt bonded to an EPDM rubber. In these patents a cooling flow of air is utilized to maintain a consistent flat surface on the polypropylene thermoplastic wear strip during co-extrusion. The layer taught in this particular patent is a rather thick (0.075) inch layer of polypropylene, which reduces flexibility of the weatherstrip. The above patents also have the disadvantage in that the resultant wear strip which is produced has a smooth wear surface. This smooth surface increases the friction between the edge of the window and the glass run channel and thus, is an undesirable side effect even though increased longevity of the base of the glass run channel may be achieved.

Thus, it has been a goal in the art to provide a wear surface which would increase the longevity of a glass run channel and would also have a reduced coefficient of friction, thereby providing an improved coating for a glass run channel.

SUMMARY OF THE INVENTION

In accordance with these goals and objectives the present invention includes a method of providing a low friction wear resistant coating on a thermoset rubber portion of a glass run channel which includes the steps of first providing a cured or uncured thermoset rubber substrate. Thereafter, a thermoplastic powdered material is provided and applied to the thermoset rubber substrate. This combination is then heated to a temperature and for a time to cause the powdered thermoplastic to melt and associate in free formed domains on the rubber surface to form a discontinuous coating heat fused to the substrate. The resulting article is a low friction wear resistant discontinuous coating for a glass run weather strip or the like. The coating presents spaced apart load bearing surface portions to a sliding glass panel.

Thus, it is an object of the present invention to provide a low friction wear resistant coating for the base of a glass run channel.

Further objects, advantages and understanding of the present invention will be better understood by reference to the brief description of the Figs. set forth below taken in conjunction with the description of the preferred embodiments and the claims appended hereto.

DESCRIPTION OF THE PREFERRED EMBODIMENTS

Figure 3:
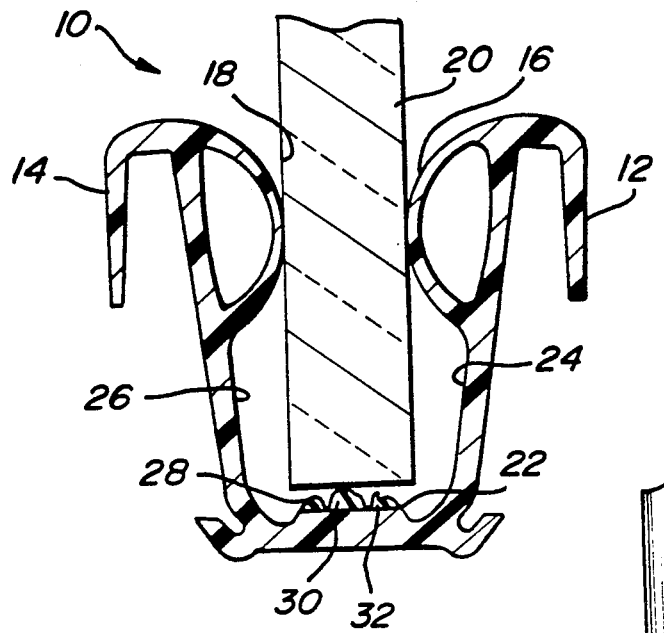
FIG. 3 is a sectional view of a glass run channel made in accordance with the teachings of the present invention.

Referring now to the figures and in particular to FIG. 3, there is shown a glass run channel generally indicated at 10 which is made of a thermoset rubber. Glass run channel 10 is adapted for fitting in a U-shaped frame of a vehicle. Glass run channel 10 includes sealing lips 12 and 14 which engage end flanges of a U-shaped door channel. Sealing portions 16 and 18 are provided for sealing against a glass window pane 20 which is slidably engaged in the glass run channel 10. The glass run channel 10 also includes a base surface 22 in the base of the U-shaped channel formed by walls 24 and 26. Typically, the base of the channel 22 is where a wear surface is desirable. However, the coating of the present invention may be utilized on any surface where low friction and wear resistance are desirable.

Figure 2:
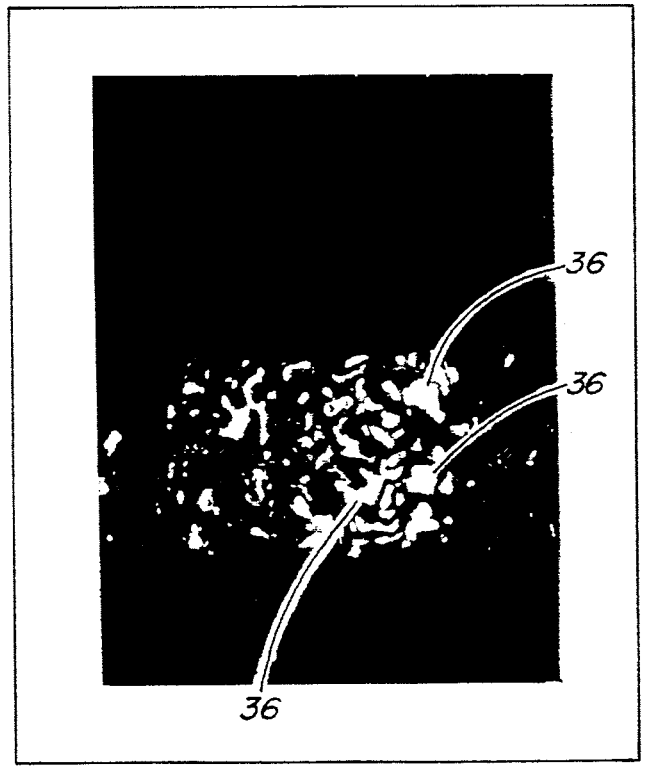
FIG. 2 is a sectional photomicrograph of a section of the weatherstrip of FIG. 1.

In accordance with the present invention there is provided a discontinuous low friction wear resistant coating formed by a plurality of thermoplastic domains such as shown at 28, 30 and 32. As shown best in FIGS. 2 and 3, the domains are free form domains which are rounded in their vertical section (shown best in FIG. 3). Such domains 28, 30 and 32 are generally dome shaped in cross-section and may include hollow portions such as shown at protrusion 28 or may be solid as shown in protrusions 30 and 32.

Figure 1:
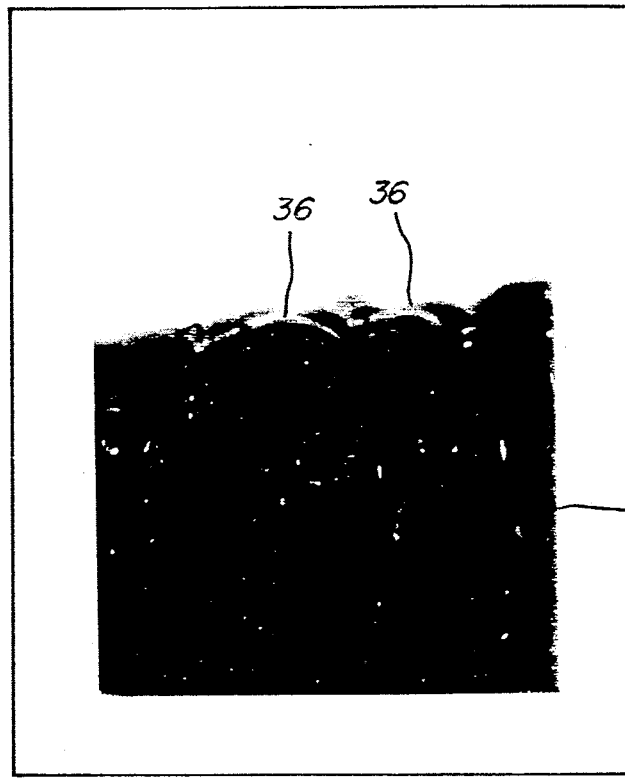
FIG. 1 is a photomicrograph of a coating produced in accordance with the teachings of the present invention.
Figure 5:
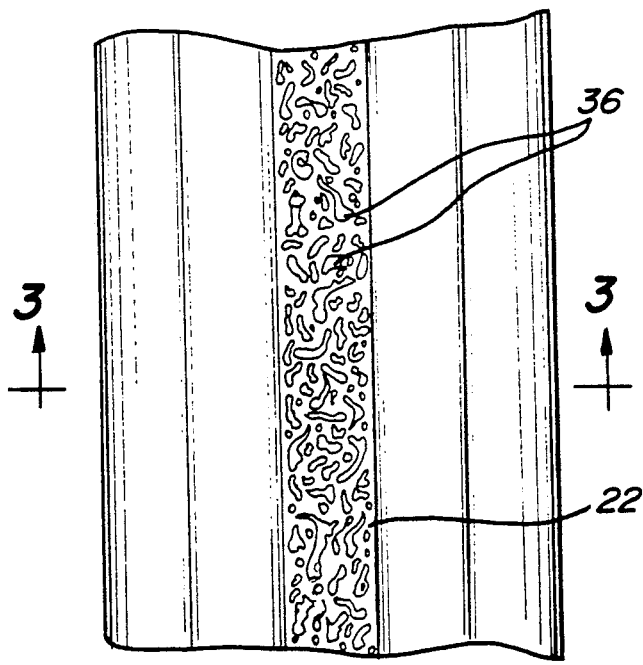
FIG. 5 is a plan view of the base of the glass run channel of FIG. 4 after the heating step takes place.

Referring now to FIGS. 1 and 5, the domains are preferably discontinuous along the rubber layer and are in various free formed domains randomly spaced about the base surface 22. In a preferred embodiment, the domains of the coating of the present invention have varying heights which are generally from about 2 mils to about 60 mils. Coatings of the present invention generally have a thickness of from about 2 mils to about 60 mils, typically from about 15 mils to about 30 mils and preferably from about 20 mils to about 30 mils.

The thermoset rubber substrate is preferably an ethylene propylene diene monomer rubber (EPDM) such as is commonly known for use in glass run channels.

As will be readily appreciated below, the domains are melt-fused to the EPDM rubber substrate of the glass run channel.

In an alternate embodiment of the present invention if a thicker coating is desired greater quantities of powdered thermoplastic materials can be utilized such that the domains run into one another to form a discontinuous coating with spaced load bearing portions of different heights. In either embodiment coatings of the present invention present spaced apart load bearing portions to a glass pane for reducing friction between the coating and the glass pane.

Figure 4:
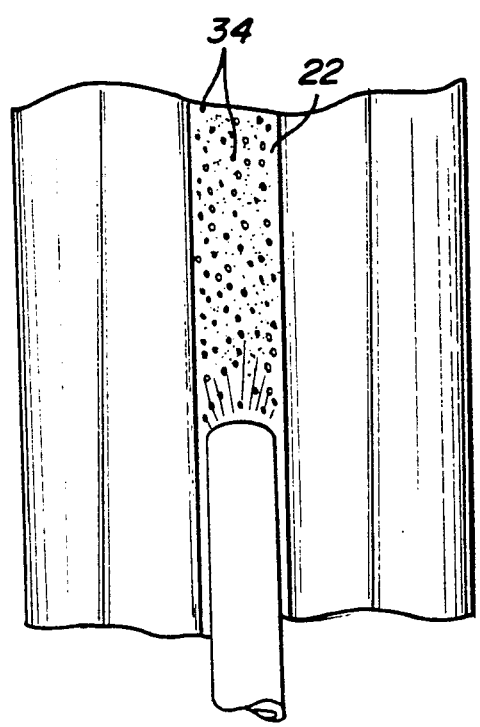
FIG. 4 is a plan view of a base of a glass run channel showing a powdered polyethylene material sprinkled on the surface.

In accordance with the method aspects of the present invention and referring in particular to FIGS. 4 and 5 a low friction wear resistant coating is provided on a thermoset rubber portion of a glass run channel by first providing a cured or uncured thermoset rubber substrate such as base surface 22 of the glass run channel 10. A powdered thermoplastic material such as illustrated by particles 34 in FIG. 4 is applied to the thermoset rubber substrate on the portions thereof which are desired to be coated with the coating of the present invention. Thereafter, the product shown in FIG. 4 is heated for a time and at a temperature to cause the powdered thermoplastic 34 to melt and associate into free form domains 36 which are spaced randomly about the substrate. This process at the same time attaches the domains 36 to the surface 22.

The thermoplastic utilized in the present invention may be of a type that when melted has a higher affinity to itself than the thermoset rubber to provide for association of thermoplastic particles by flowing into one another into free formed domains, but which will not wet the thermoset substrate and form a continuous layer. In a preferred embodiment of the present invention, the powdered material is preferably a high density polyethylene material which is powdered into sizes of from about 50 microns to about 180 microns. A preferred high density polyethylene material is a modified high density polyethylene material obtained from Exxon which has a average molecular weight of from about 60,000 to 200,000, a molecular number of from about 8,000 to 25,000, a specific gravity of 0.95, a softening temperature of 119° C. and a full melt temperature at 125° C., which material has a shore D hardness of 56. A particularly preferred material for use in the present invention is an Exxon No. 15188-006-003 material obtainable from Exxon Baytown Polymers.

A preferred method is to apply the powder in a controlled manner, such as by sprinkling or the like, onto the portions of the glass run channel to be coated after extrusion but prior to curing of the thermoset rubber. Thus, when the rubber portion is cured, the thermoplastic melts and the particles having a high affinity for one another flow together and "bead up" on the surface of the substrate to form various free form shaped domains 36 which are larger than the individual particles. Thus, when melted the thermoplastic acts much as water droplets on a waxed vehicle surface which associate with one another and "bead up" forming free forms as they flow into one another. Suitable temperatures for forming complete melting of the coating are preferably greater than 125° C. Curing temperatures of EPDM rubber such as 425° F. for 3-5 minutes are sufficient to melt and form the coating of the present invention.

The amount of powder applied may be varied depending upon whether a thin, spaced domain coating is desired or whether a thicker coating is desired. Thus, utilizing powder in amounts of generally from about 10 to about 40 milligrams/cm²; and preferably from about 20 to about 30 milligrams/cm² will provide spaced domains having heights of from about 20 to about 30 mils. Whereas if a thicker coating is desired wherein the domains are essentially run together in discontinuous coatings of 40 to 60 mils may be provided by utilizing generally from about 25 to about 35 milligrams/cm²; and preferably from about 30 to about 35 milligrams/cm².

Upon preparation of the glass run channel of the present invention it is found that the domains are adhered to the thermoset rubber composition in a discontinuous coating across the surface to be protected. Because of the varying heights and the spaced domains the coefficient of friction of the coating of the present invention is from about 0.100 to about 0.200 and preferably is about 0.146 using the ASTM D-1894 test.

Thus, in the present invention an extremely low coefficient of friction is realized and a highly wear resistant coating is produced due to the discontinuous thermoplastic coating which is covering the EPDM rubber.

Further understanding of the present invention will be obtained through review of the following example which is set forth below for purposes of illustration but not limitation.

EXAMPLE

Samples were prepared by covering milled EPDM rubber strips with polyethylene powder dispensed from a salt shaker utilizing the parameters set forth in Table I. The rubber was formulated (100 RHC weight) using 44.44 parts Vistalon 7000, 44.44 parts Vistalon 6505, 11.12 parts Vistalon 2504, 148.15 parts N550 Black, 37.04 parts M. Cyprubond Talc, 9.00 parts Zinc Oxide, 1.00 parts Zinc Stearate, 7.41 parts Morcal 85 and 100.00 parts Sunpar 2280 Oil. Three varied aspects of sample preparation were varied as follows: 1) pre-curing before the powder was applied; 2) the temperature of the rubber at the moment of powder application; and 3) the cure temperature of the rubber; (samples were cured at both 425 degrees and 450 degrees).

The rubber strips were extruded into sizes of 2.54×20 cm to which the amounts of powder were applied as shown in the Tables. The polyethylene powder utilized was Exxon No. 15188-006-003 with particle size ranges from 50 to 180 microns.

The thickness of these rubber strips was held to approximately 80 mils. However, a separate group of samples was prepared wherein the rubber type and curing process were kept constant, but the rubber thickness was varied. Also, two samples of this group were bonded to 25 mils steel prior to application of the coating.

TABLE I

| Rubber Type | Pre-Cured | Cure Temp. (F.) | Powder Appl. Temp. (F.) | Coating Weight (Grams) |
| --- | --- | --- | --- | --- |
| EPDM | NO | 425 | RT | 1.2 |
| EPDM | NO | 425 | RT | 1.2 |
| EPDM | NO | 425 | RT | 1.2 |
| EPDM | YES | 425 | RT | 1.0 |
| EPDM | YES | 425 | RT | 1.0 |
| EPDM | YES | 425 | RT | 1.0 |
| EPDM | NO | 425 | >250 | 0.9 |
| EPDM | NO | 425 | >250 | 0.9 |
| EPDM | NO | 425 | >250 | 0.9 |
| EPDM | YES | 425 | >250 | 0.9 |
| EPDM | YES | 425 | >250 | 0.9 |
| EPDM | YES | 425 | >250 | 0.9 |
| EPDM | NO | 450 | >250 | 1.0 |
| EPDM | NO | 450 | >250 | 1.0 |
| EPDM | NO | 450 | >250 | 1.0 |
| EPDM | YES | 450 | >250 | 0.9 |
| EPDM | YES | 450 | >250 | 0.9 |
| EPDM | YES | 450 | >250 | 0.9 |
| EPDM | YES | 450 | RT | 1.0 |
| EPDM | YES | 450 | RT | 1.0 |
| EPDM | YES | 450 | RT | 1.0 |

TABLE I-continued

| Rubber Type | Pre-Cured | Cure Temp. (F.) | Powder Appl. Temp. (F.) | Coating Weight (Grams) |
| --- | --- | --- | --- | --- |
| EPDM | NO | 450 | RT | 1.0 |
| EPDM | NO | 450 | RT | 1.0 |
| EPDM | NO | 450 | RT | 1.0 |

*RT = room temperature.
Further compositions were prepared in accordance with Table II below.

TABLE II

| Sample No. | Rubber Thickness | Steel Thickness | Coating (Grams) |
| --- | --- | --- | --- |
| 1 | .025" | N/A | 1.0 |
| 2 | .025" | N/A | 1.0 |
| 3 | .050" | N/A | 1.0 |
| 4 | .050" | N/A | 1.0 |
| 5 | .120" | N/A | 1.0 |
| 6 | .120" | N/A | 1.0 |
| 7 | .020" | .025" | 1.0 |
| 8 | .020" | .025" | 1.0 |
| 9 | .063" | .025" | 1.0 |
| 10 | .063" | .025" | 1.0 |

The samples in Table II were prepared with the formulation above and were uncured when the coating was applied. The polyethylene powder was applied at room temperature. Samples 1 to 6 were cured at 425° F. for 3.5 minutes, while 7 to 10 were cured at 425° F. for 5 minutes.

The coatings as set forth above produced discontinuous coatings which had free form domains. The coatings were found to have low friction and were wear resistant.

While the above description constitutes the preferred embodiments of the present invention, it is to be appreciated that the invention is susceptible to modification, variation and change without departing from the proper scope and the fair meaning of the accompanying claims.

What is claimed:

1. A glass run weatherstrip comprising:
   a glass run channel having at least a portion thereof made of an ethylene propylene diene rubber;
   a discontinuous thermoplastic coating formed by a powder, high density polyethylene material having a molecular weight of from about 60,000 to about 200,000 heat fused directly to said ethylene propylene diene rubber material of said glass run weatherstrip for presenting spaced apart surfaces to a glass panel such that a low friction wear resistant surface having a coefficient of friction of from about 0.100 to about 0.200.

2. The coating of claim 1 wherein said discontinuous thermoplastic coating formed in free form domains having heights of from about 2 mils to about 60 mils.

3. The coating of claim 1 wherein said domains are generally dome shaped in vertical cross-section.

4. The coating of claim 1 wherein said domains are randomly spaced on said ethylene propylene diene rubber.

5. The coating of claim 4 wherein said domains have varying heights such that less than 50% of said domains will contact an edge of a glass panel surface.

6. The coating of claim 5 wherein the height of said domains have a height of about 20 mils or less.

7. The coating of claim 6 wherein the thermoplastic is a high density polyethylene.

8. A glass run weatherstrip comprising:
   a glass run channel comprising an ethylene propylene diene monomer rubber and a discontinuous coating of a melted high density polyethylene material powder having a molecular weight of from about 60,000 to about 200,000 heat fused to said ethylene propylene diene monomer rubber thereof for forming free formed domains, thereby providing spaced apart surfaces on said weatherstrip for low friction wear resistant engagement with a glass window, thereby providing a surface having a coefficient of friction of from about 0.100 to about 0.200.

9. The glass run weatherstrip of claim 8 wherein said coating is provided in a base surface of said glass run channel.

* * * * *